United States Patent
Horiguchi et al.

(10) Patent No.: US 12,421,388 B2
(45) Date of Patent: Sep. 23, 2025

(54) FLAME RETARDANT POLYESTER RESIN COMPOSITION AND MOLDED ARTICLE COMPRISING SAME

(71) Applicant: TOYOBO CO., LTD., Osaka (JP)

(72) Inventors: Satoru Horiguchi, Otsu (JP); Yoshitaka Ayuzawa, Otsu (JP)

(73) Assignee: TOYOBO MC CORPORATION, Osaka (JP)

( * ) Notice: Subject to any disclaimer, the term of this patent is extended or adjusted under 35 U.S.C. 154(b) by 697 days.

(21) Appl. No.: 17/800,065

(22) PCT Filed: Feb. 15, 2021

(86) PCT No.: PCT/JP2021/005545
§ 371 (c)(1),
(2) Date: Aug. 16, 2022

(87) PCT Pub. No.: WO2021/166851
PCT Pub. Date: Aug. 26, 2021

(65) Prior Publication Data
US 2023/0094235 A1   Mar. 30, 2023

(30) Foreign Application Priority Data
Feb. 19, 2020   (JP) ................. 2020-025995

(51) Int. Cl.
*C08L 67/02* (2006.01)
(52) U.S. Cl.
CPC ......... *C08L 67/02* (2013.01); *C08L 2205/025* (2013.01); *C08L 2205/03* (2013.01)
(58) Field of Classification Search
CPC .. C08G 63/183; C08K 5/5313; C08K 5/5399; C08K 7/14; C08L 2205/02; C08L 2205/025; C08L 2205/03; C08L 67/02
See application file for complete search history.

(56) References Cited

U.S. PATENT DOCUMENTS

| | | |
|---|---|---|
| 5,814,690 A | 9/1998 | Penn |
| 6,255,371 B1 | 7/2001 | Schlosser et al. |
| 2003/0083409 A1 | 5/2003 | Bienmuller et al. |
| 2005/0137297 A1 | 6/2005 | De Wit |
| 2010/0069539 A1 | 3/2010 | Morimoto et al. |
| 2010/0233474 A1 | 9/2010 | Haruhara et al. |
| 2011/0200811 A1 | 8/2011 | Tsunoda et al. |
| 2012/0083553 A1 | 4/2012 | Wakatsuka et al. |
| 2012/0101197 A1 | 4/2012 | Crevcoeur et al. |
| 2013/0203905 A1 | 8/2013 | Hirakawa et al. |
| 2016/0024301 A1 | 1/2016 | Hayashida |
| 2019/0241736 A1 | 8/2019 | Endtner et al. |

FOREIGN PATENT DOCUMENTS

| | | |
|---|---|---|
| CN | 101595183 | 12/2009 |
| CN | 102105533 | 6/2011 |
| CN | 102115579 | 7/2011 |
| CN | 102369241 | 3/2012 |
| CN | 102746624 | 10/2012 |
| CN | 102918108 | 2/2013 |
| CN | 103160080 | 6/2013 |
| CN | 104272885 | 1/2015 |
| CN | 104520380 | 4/2015 |
| CN | 105051110 | 11/2015 |
| CN | 105377989 | 3/2016 |
| CN | 106280310 | 1/2017 |
| EP | 2 881 434 | 6/2015 |
| EP | 2 927 279 | 10/2015 |
| GB | 1 382 363 | 1/1975 |
| JP | 5-70671 | 3/1993 |
| JP | 11-152402 | 6/1999 |
| JP | 2000-103973 | 4/2000 |
| JP | 2001-72978 | 3/2001 |
| JP | 2001-207038 | 7/2001 |
| JP | 2002-212405 | 7/2002 |
| JP | 2007-314619 | 12/2007 |
| JP | 2010-280793 | 12/2010 |
| JP | 2011-127048 | 6/2011 |
| JP | 2012-522083 | 9/2012 |
| JP | 5396690 | 1/2014 |
| JP | 2017-39878 | 2/2017 |
| JP | 2019-526672 | 9/2019 |
| WO | 03/002664 | 1/2003 |
| WO | 2007/077794 | 7/2007 |
| WO | 2011/155287 | 12/2011 |
| WO | 2014/084157 | 6/2014 |
| WO | 2014/088105 | 6/2014 |
| WO | 2015/008831 | 1/2015 |

OTHER PUBLICATIONS

Chinese Office Action issued Apr. 29, 2023 in corresponding Chinese Patent Application No. 202180014959.9, with English translation.
Heng Yang et al., Progress in Research of Alkyl-Phosphinate Functionalization, Journal of Capital Normal University (Natural Science Edition), (Apr. 2019), No. 2, pp. 30-36, with English Abstract.
Notice of Granting a Patent Right for Invention issued Oct. 31, 2023 in corresponding Chinese Patent Application No. 202180014959.9, with English language translation.
International Search Report (ISR) issued Apr. 27, 2021 in International (PCT) Application No. PCT/JP2021/005545.

*Primary Examiner* — Ana L. Woodward
(74) *Attorney, Agent, or Firm* — WENDEROTH, LIND & PONACK, L.L.P.

(57) ABSTRACT

The present invention is a flame retardant polyester resin composition that contains 3 to 74% by mass of a polybutylene terephthalate resin (A), 3 to 60% by mass of a polyethylene terephthalate resin (B1), 3 to 50% by mass of a copolyester resin (B2), 10 to 50% by mass of a halogen-free flame retardant (C), and 10 to 40% by mass of a glass fiber (D), wherein the copolyester resin (B2) is a polyester resin obtained by copolymerizing an ethylene terephthalate unit with at least one selected from the group consisting of neopentyl glycol, 1,2-propanediol, diethylene glycol, 1,4-cyclohexanedimethanol, and isophthalic acid, and that satisfies prescribed characteristics.

4 Claims, 1 Drawing Sheet

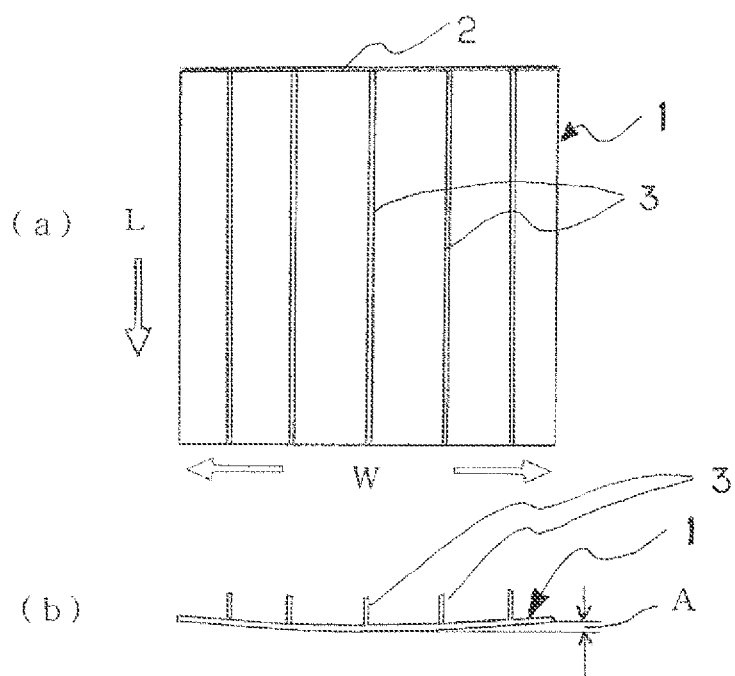

FLAME RETARDANT POLYESTER RESIN COMPOSITION AND MOLDED ARTICLE COMPRISING SAME

TECHNICAL FIELD

The present invention relates to a glass fiber-reinforced polyester resin composition having been made flame retardant using a halogen-free flame retardant. More particularly, the present invention relates to a flame retardant polyester resin composition capable of providing a halogen-free flame retardant molded article that suffers less floating of glass fibers or the like, is excellent in molded article appearance, and has little warpage deformation though it has high rigidity and high strength.

BACKGROUND ART

Since a polyester resin has excellent mechanical characteristics, heat resistance and chemical resistance, a flame retardant polyester resin composition obtained by compounding a polyester resin with a flame retardant has been conventionally widely utilized for various parts requiring flame retardance, such as automobile parts, electric and electronic parts, and industrial machine parts.

Particularly, a housing of an electronic equipment part or the like is required to have rigidity, good appearance, and besides, excellent low-warpage properties in addition to flame retardance.

For making a polyester resin flame retardant, a so-called halogen-based flame retardant obtained by compounding a bromine-based flame retardant with an antimony compound is common, but it has problems such that the amount of smoke generated during combustion is large, and it is suspected of emitting a harmful substance during combustion. Therefore, a polyester resin composition having been made flame retardant using a flame retardant that does not contain the halogen at all has been desired in recent years, and various flame retardant techniques using a nitrogen-containing compound, a phosphorus-based compound, and the like have been proposed. For example, in Patent Literature 1, a flame retardant resin composition composed of polyalkylene terephthalate, a reinforcing filler, a melamine-cyanuric acid adduct, and resorcinol bis(aryl phosphate) is disclosed. In Patent Literature 2, a flame retardant polyester composition composed of a reinforcing component and a polymer component containing a mixed flame retardant containing poly(butylene terephthalate), an aromatic phosphate oligomer and melamine pyrophosphate is disclosed. In Patent Literature 3, a flame retardant resin composition containing a thermoplastic resin, a phosphorus compound having a phosphonyl group (>P(=O)H), and a phenolic resin is disclosed. Moreover, a flame retardant resin composition due to a combination of flame retardants (Patent Literature 4) containing an organic phosphinic acid salt, and a reaction product of melamine and phosphoric acid or a reaction product of a condensate of melamine and phosphoric acid is disclosed. In these literatures, however, information to highly control a balance among flame retardance, warpage deformation, retention of mechanical characteristics, moldability and appearance characteristics is not included.

On the other hand, it is disclosed that in order to obtain a polyester resin molded article having little warpage deformation and having high strength/high rigidity and molded article appearance that are compatible with each other, controlling a solidification rate of a polyester-based resin composition in a molding mold is effective (Patent Literature 5). However, a composition containing less than 30% by mass of an inorganic reinforcement is not mentioned, and by adding a flame retardant necessary for achieving V-0 flame retardance, decomposition of polyester is brought about to easily cause a lowering in mechanical characteristics, but in Patent Literature 5, any method to make flame retardance and high rigidity compatible with each other is not described.

CITATION LIST

Patent Literature

PTL 1: Japanese Patent Laying-Open No. 5-70671
PTL 2: Japanese Patent Laying-Open No. 11-152402
PTL 3: Japanese Patent Laying-Open No. 2000-103973
PTL 4: Japanese Patent Laying-Open No. 2001-72978
PTL 5: Japanese Patent No. 5396690

SUMMARY OF INVENTION

Technical Problem

The present invention has been made in order to solve the above problem, and it is an object of the present invention to provide a flame retardant polyester resin composition from which a molded article having excellent heat resistance, little warpage deformation and good molded article appearance and having high strength/high rigidity and flame retardance that are compatible with each other can be obtained. Moreover, it has been newly found that the type of a flame retardant affects residence stability of a flame retardant polyester resin composition, and it is also an object of the present invention to provide a flame retardant polyester resin composition having excellent residence stability in addition to the above characteristics.

Solution to Problem

In order to solve the above problem, the present inventors have earnestly studied, and as a result, they have found that by incorporating a polybutylene terephthalate resin, a polyethylene terephthalate resin, a copolyester resin, a flame retardant, and a glass fiber at prescribed compounding ratios, the balance among the above characteristics can be highly retained.

That is to say, the present invention is as follows.

[1]

A flame retardant polyester resin composition comprising 3 to 74% by mass of a polybutylene terephthalate resin (A), 3 to 60% by mass of a polyethylene terephthalate resin (B1), 3 to 50% by mass of a copolyester resin (B2), 10 to 50% by mass of a halogen-free flame retardant (C), and 10 to 40% by mass of a glass fiber (D), wherein
  the copolyester resin (B2) is a polyester resin obtained by copolymerizing an ethylene terephthalate unit with at least one selected from the group consisting of neopentyl glycol, 1,2-propanediol, diethylene glycol, 1,4-cyclohexanedimethanol, and isophthalic acid;
  a melt mass flow rate (MFR) of the flame retardant polyester resin composition at a moisture content of no more than 0.05% is no less than 10 g/10 min (measured at 265° C. under a load of 2160 g in accordance with JIS K 7210-1:2014);

the flame retardant polyester resin composition exhibits flame retardance of UL94 standard V-0 (1/16 inch thick); and the flame retardant polyester resin composition has a flexural strength, as measured in accordance with ISO-178, of no less than 140 MPa, and satisfies the following expression (1)

$$0.5 \le \beta/\alpha \quad (1)$$

wherein α is a flexural strength of a molded article obtained by molding the flame retardant polyester resin composition at a cylinder temperature of 265° C. for a residence time of 5 minutes, and β is a flexural strength of a molded article obtained by molding the flame retardant polyester resin composition at a cylinder temperature of 265° C. for a residence time of 10 minutes.

[2]
The flame retardant polyester resin composition according to [1], wherein the halogen-free flame retardant (C) comprises a phosphinic acid metal salt.

[3]
A molded article being any one of an electric/electronic part, OA equipment, a household electric appliance part, an automobile part, and a machine mechanism part, the molded article comprising the flame retardant polyester resin composition according to [1] or [2].

Advantageous Effects of Invention

From the flame retardant polyester resin composition of the present invention, a molded article having excellent heat resistance, little warpage deformation and good molded article appearance and having high strength/high rigidity and flame retardance that are compatible with each other can be obtained, and moreover, the flame retardant polyester resin composition has excellent residence stability.

BRIEF DESCRIPTION OF DRAWINGS

FIG. 1 is a group of (a) a schematic top view and (b) a schematic side view each of which schematically shows an example of a molded article produced in order to evaluate warpage deformation.

DESCRIPTION OF EMBODIMENTS

The present invention will be specifically described hereinafter.

The content (amount compounded) of each component in the flame retardant polyester resin composition of the present invention is an amount thereof given when the amount of the flame retardant polyester resin composition is 100% by mass. The amount of each component compounded in the production of the flame retardant polyester resin composition becomes a content thereof in the flame retardant polyester resin composition.

The polybutylene terephthalate resin (A) in the present invention is a thermoplastic polyester resin obtained from terephthalic acid and 1,4-butenediol through polycondensation, and the reduced viscosity (0.1 g of a sample is dissolved in 25 mL of a mixed solvent of phenol/tetrachloroethene (mass ratio 6/4), and the viscosity is measured at 30° C. using an Ubbelohde viscometer; unit dL/g) is preferably in the range of 0.4 to 1.2 dL/g, and more preferably in the range of 0.5 to 0.9 dL/g. If the reduced viscosity is less than 0.4 dL/g, toughness is decreased, and if it exceeds 1.2 dL/g, fluidity is decreased, so that desired good molded article appearance may not be obtained.

The amount of the polybutylene terephthalate resin (A) compounded in the flame retardant polyester resin composition of the present invention is 3 to 74% by mass, preferably 10 to 70% by mass, more preferably 20 to 60% by mass, still more preferably 30 to 55% by mass, particularly preferably 30 to 45% by mass, and most preferably 32 to 42% by mass.

The polyethylene terephthalate resin (B1) in the present invention is a thermoplastic polyester resin obtained from terephthalic acid and ethylene glycol through polycondensation, and the reduced viscosity (0.1 g of a sample is dissolved in 25 mL of a mixed solvent of phenol/tetrachloroethene (mass ratio 6/4), and the viscosity is measured at 30° C. using an Ubbelohde viscometer; unit dL/g) is preferably in the range of 0.4 to 1.0 dL/g, and more preferably in the range of 0.5 to 0.9 dL/g. If the reduced viscosity is less than 0.4 dL/g, toughness is decreased, and if it exceeds 1.0 dL/g, fluidity is decreased, so that desired good molded article appearance may not be obtained.

The amount of the polyethylene terephthalate resin (B1) compounded in the flame retardant polyester resin composition of the present invention is 3 to 60% by mass, preferably 3 to 50% by mass, more preferably 3 to 45% by mass, still more preferably 3 to 25% by mass, particularly preferably 4 to 15% by mass, and most preferably 4 to 12% by mass.

The copolyester resin (B2) in the present invention is a polyester resin obtained by copolymerizing an ethylene terephthalate unit composed of terephthalic acid (TPA) and ethylene glycol (EG) with at least one comonomer selected from the group consisting of neopentyl glycol (NPG), 1,2-propanediol (1,2PG), diethylene glycol (DEG), 1,4-cyclohexanedimethanol (CHDM), and isophthalic acid (IPA). Regarding the copolymerization amounts of these comonomers, the amount of at least one component is preferably 20 to 70% by mol, more preferably 20 to 60% by mol, and still more preferably 25 to 50% by mol, with respect to 100% by mol of the amount of an acid component to constitute the copolyester resin (B2) and 100% by mol of the amount of a glycol component to constitute the same.

In the copolyester resin (B2), sebacic acid (SA), adipic acid (AA), 2,6-naphthalenedicarboxylic acid (NPA), trimellitic acid (TMA), etc. as the acid components, and 1,4-butanediol (BD), 1,3-propanediol (1,3PG), 2-methyl-1,3-propanediol (2MG), polytetramethylene glycol (PTMG), ε-caprolactone, polycarbonate diol, etc. as the glycol components may be copolymerized as long as the present invention is not impaired, in addition to the above-mentioned comonomers.

Specific examples include, but not limited to, copolyester resins, such as a TPA//EG/NPG copolymer, a TPA/IPA//EG copolymer, a TPA//EG/1,2PG copolymer, a TPA/IPA//EG/NPG copolymer, a TPA//EG/CHDM copolymer, a TPA/IPA//TMA//2MG/1,2PG copolymer, a TPE/IPA/TMA//2MG/CHDM copolymer, a TPA/IPA/SA//EG/NPG/CHDM copolymer, and a TPA/IPA//EG/1,3PG copolymer.

The reduced viscosity (0.1 g of a sample is dissolved in 25 mL of a mixed solvent of phenol/tetrachloroethene (mass ratio 6/4), and the viscosity is measured at 30° C. using an Ubbelohde viscometer; unit dL/g) of the copolyester resin (B2) for use in the present invention slightly varies depending on a specific copolyester resin, but it is preferably 0.4 to 1.5 dL/g, and more preferably 0.4 to 1.3 dL/g. If the reduced viscosity is less than 0.4 dL/g, toughness is decreased, and on the other hand, if it exceeds 1.5 dL/g, fluidity is decreased.

The amount of the copolyester resin (132) compounded in the present invention is 3 to 50% by mass, preferably 3 to 40% by mass, more preferably 3 to 30% by mass, still more preferably 3 to 20% by mass, and particularly preferably 4 to 15% by mass. If the amount compounded exceeds 50% by mass, heat resistance (deflection temperature under load, HDT) is decreased.

As the halogen-free flame retardant (C) in the present invention, for example, a phosphorus-based flame retardant or a non-phosphorus-based flame retardant can be used.

Examples of the phosphorus-based flame retardants include a red phosphorus-based compound, a phosphinic acid metal salt (c1), a reaction product (c2) composed of melamine and phosphoric acid, a phosphazene compound (c3), and a phosphinic acid derivative (c4), and these can be used singly or in combination of a plurality of kinds.

The phosphinic acid metal salt (c1) is at least one of a phosphinic acid salt represented by the following general formula (1) and a diphosphinic acid salt represented by the general formula (2).

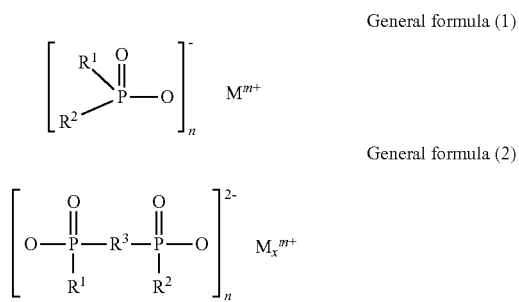

General formula (1)

General formula (2)

In the general formulae (1) and (2), $R^1$ and $R^2$ are the same or different and are each linear or branched alkyl having 1 to 6 carbon atoms and/or aryl, $R^3$ is linear or branched alkylene having 1 to 10 carbon atoms, arylene having 6 to 10 carbon atoms, alkylarylene having 6 to 10 carbon atoms or arylalkylene having 6 to 10 carbon atoms, M is any one of a calcium ion, a magnesium ion, an aluminum ion and a zinc ion, m is 2 or 3, n is 1, 2 or 3, and x is 1 or 2.

$R^1$ and $R^2$ are each preferably methyl, ethyl, or n-propyl, isopropyl, n-butyl, tert-butyl, n-pentyl, and/or phenyl.

$R^3$ is preferably methylene, ethylene, n-propylene, isopropylene, n-butylene, tert-butylene, n-pentylene, n-octene, n-dodecylene, phenylene, naphthylene, methylphenylene, ethylphenylene, tert-butylphenylene, methylnaphthylene, ethylnaphthylene, or tert-butylnaphthylene, phenylmethylene, phenylethylene, phenyl propylene, or phenylbutylene.

M is preferably an aluminum ion, or a zinc ion, or a calcium ion.

The term "phosphinic acid salt" used hereinafter includes a phosphinic acid salt, a diphosphinic acid salt, and a polymer of these. This phosphinic acid salt is produced in a water solvent, and is inherently a monomeric compound, but depending on the reaction conditions, a polymeric phosphinic acid salt can be sometimes formed in the specific environment.

Phosphinic acid that is preferable as one component of the phosphinic acid salt is, for example, dimethylphosphinic acid, ethyl methylphosphinic acid, diethylphosphinic acid, methyl-n-propylenephosphinic acid, methane-1,2-di(methylphosphinic acid), benzene-1,4-(dimethylphosphinic acid), methylphenylphosphinic acid, or diphenylphosphinic acid.

The phosphinic acid salt in the present invention can be produced by such a known method as described in European Patent Application Publication No. 699708.

The phosphinic acid salt can be produced by, for example, allowing a phosphinic acid to react with a metal carbonate, a metal hydroxide or a metal oxide in an aqueous solution. As the phosphinic acid salt for use in the present invention, a known compound can be used, but above all, aluminum phosphinate is preferable.

The reaction product (c2) composed of melamine and phosphoric acid in the present invention is a cyanamide derivative having at least one amino group or a reaction product of the cyanamide derivative and phosphoric acids, and is specifically a compound having an amino group and a unit represented by —N=C=N— or —N=C(—N<)$_2$, and examples thereof include cyclic cyanamide derivatives, such as amino group-containing triazines (e.g, amino group-containing 1,3,5-triazines, such as melamine, melame, meleme, melon, guanamine, acetoguanamine and benzoguanamine, amino group-containing 1,2,4-triazines, such as 3-amino-1,2,4-triazine), and amino group-containing triazoles (e.g., amino group-containing 1,3,4-triazoles, such as 2,5-diamino-1,3,4-triazole); and non-cyclic cyanamide derivatives, such as guanidines [e.g., guanidine, guanidine derivatives (dicyandiamide, guanidyl urea, etc.)]. Preferred cyanamide derivatives are amino group-containing 1,3,5-triazines, guanidine, and its derivatives, particularly melamine. In the case of melamine, particularly, melamine cyanurate can be used as one of its derivatives. Such cyanamide derivatives can be used singly or in combination of two or more.

As the cyanamide derivative having at least one amino group or the reaction product of the cyanamide derivative and phosphoric acid in the present invention, preferred is a substance containing at least one of a condensation product of melamine, a reaction product of melamine or a condensation product of melamine and phosphoric acid, and a reaction product of melamine and a phosphoric acid condensate, more preferred is melamine polyphosphate, meleme polyphosphate, melame polyphosphate, or dimelamine pyrophosphate, and particularly preferred is melamine polyphosphate having a long chain length with a condensation degree of no less than 2, particularly no less than 10 and no more than 50.

The phosphazene compound (c3) in the present invention is an organic compound having a —P=N— bond in a molecule, preferably cyclic phenoxyphosphazene having a structure represented by the following general formula (3) in a molecule or chain phenoxyphosphazene, or a crosslinked phenoxyphosphazene compound wherein at least one phenoxyphosphazene has been crosslinked with a crosslinking group.

Specific examples of the cyclic phosphazenes include cyclic phenoxyphosphazenes, such as trade name SPE-100 manufactured by Otsuka Chemical Co., Ltd., cyclic cyanophenoxyphosphazenes, such as trade name FP-300 manufactured by FUSHIMI Pharmaceutical Co., Ltd., and trade name SPH-100 manufactured by Otsuka Chemical Co., Ltd. Since the chain phenoxyphosphazene, the crosslinked phenoxyphosphazene, etc. have a substituent at the molecular end, the phosphorus content is generally decreased as compared with that in the cyclic phosphazene, but bleeding and the like tend to be suppressed, so that they need to be properly used according to the resin to which they are added.

[Formula 3]

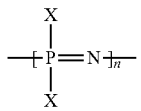

General formula (3)

In the general formula (3), X is a phenoxy group, and n is an integer of 3 to 10000.

Non-reactive phosphazene sometimes suffers bleeding on the surface over time, is affected by hydrolysis or the like under severe usage conditions to elute liberated phosphorus, or is decreased in insulation characteristics due to a decomposition product, and therefore, reactive phosphazene having a functional group having affinity for polyamide is more preferably selected. Specifically, cyclic hydroxyphenoxyphosphazene having a hydroxyl group, or the like can be mentioned.

The phosphinic acid derivative (c4) in the present invention is different from the aforesaid phosphorus-based compounds specified by (c1), (c2) and (c3), and is preferably represented by the following general formula (4), and specific examples include HCA (9,10-dihydro-9-oxa-10-phosphaphenanthrene-10-oxide), HCA-HQ (10-(2,5-dihydroxyphenyl)-10-hydro-9-oxa-10-phosphaphenanthrene-10-oxide), 10-(2,5-dihydorxynaphthyl)-10-hydro-9-oxa-10-phosphaphenanthrene-10-oxide, RCA (10-benzyl-10-hydro-9-oxa-10-phosphaphenanthrene-10-oxide), phenylphosphinic acid, and diphenylphosphinic acid.

[Formula 4]

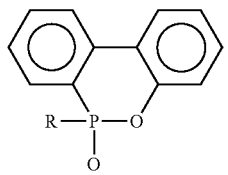

General formula (4)

In the general formula (4), R is a hydrogen atom, a phenoxy group or an alkyl group having 1 to 10 carbon atoms.

In the present invention, (c1) is preferably contained as the halogen-free flame retardant (C). It is also preferable to use (c1) and at least one selected from (c2), (c3) and (c4) in combination as the halogen-free flame retardants (C), and a mixing ratio thereof by mass is preferably (c1)/[phosphorus-based flame retardants other than (c1)]=(c1)/[(c2)+(c3)+(c4)]=30 to 70/70 to 30 from the viewpoints of bleed and physical properties. However, when residence stability needs to be enhanced, the amount of (c3) is preferably small, and specifically, it is preferable that the amount of (c3) be no more than 30% by mass in the halogen-free flame retardant (C), and it is more preferable that (c3) not to be used.

In the present invention, a non-halogen-based flame retardant other than the non-phosphorus-based flame retardant may be used. The phosphorus-based flame retardant and the non-phosphorus-based flame retardant may be used in combination. Examples of the types of the non-halogen-based flame retardant other than the phosphorus-based flame retardant include a nitrogen-based flame retardant, a silicon-based flame retardant, a metal hydroxide, and a metal boroxide.

The amount of the halogen-free flame retardant (C) compounded is 10 to 50% by mass, preferably 10 to 40% by mass, more preferably 12 to 30% by mass, and still more preferably 15 to 25% by mass.

The glass fiber (D) in the present invention has a mean fiber diameter of approximately 4 to 20 μm and a cut length of approximately 3 to 6 mm, and a very common glass fiber can be used. The glass fiber is preferably one having been treated in advance with a coupling agent, such as an organosilane-based compound, an organotitanium-based compound, an organoborane-based compound, or an epoxy-based compound. A polyester-based resin composition in which a glass fiber having been treated with a coupling agent is compounded is preferable because a molded article having excellent mechanical characteristics and excellent appearance characteristics is obtained. Also, regarding other inorganic reinforcements, when treatment with a coupling agent has not been carried out, they can be used by post addition.

A glass fiber having a circular section or a non-circular section as a sectional shape of the glass fiber can be used. For reducing warpage, a glass fiber having a non-circular section as a sectional shape of the glass fiber is preferable. The glass fibers having a non-circular section also include those having a substantially elliptical shape, a substantially oval shape and a substantially cocoon shape on the section perpendicular to the lengthwise direction of the fiber length, and the flatness is preferably 1.5 to 10, more preferably 1.5 to 8, and still more preferably 3 to 6. Here, the flatness is a ratio of long diameter/short diameter when a rectangle of a minimum area circumscribing a section perpendicular to the lengthwise direction of a glass fiber is supposed, and the length of a long side of this rectangle is taken as the long diameter and the length of a short side thereof is taken as the short diameter. The thickness of the glass fiber is not particularly limited, but the short diameter is 1 to 20 μm, and the long diameter is approximately 2 to 100 m.

The amount of the glass fiber (D) compounded in the present invention is 10 to 40% by mass, and preferably 15 to 35% by mass.

In the flame retardant polyester resin composition of the present invention, a known inorganic filler can be contained in addition to the above-mentioned glass fiber (D). Examples of the inorganic fillers include a reinforcing filler, a conductive filler, a magnetic filler, a thermally conductive filler, and a filler for suppressing thermal yellowing, which are separated by purpose, and specific examples include glass bead, glass flake, glass balloon, silica, talc, kaolin, mica, alumina, hydrotalcite, montmorillonite, graphite, carbon nanotube, fullerene, indium oxide, tin oxide, iron oxide, magnesium oxide, aluminum hydroxide, magnesium hydroxide, calcium hydroxide, red phosphorus, calcium carbonate, lead titanate zirconate, barium titanate, aluminum nitride, boron nitride, zinc borate, barium sulfate, and non-needle-like wollastonite, potassium titanate, aluminum borate, magnesium sulfate, zinc oxide, and calcium carbonate.

To the flame retardant polyester resin composition of the present invention, a light or heat stabilizer, an antioxidant, an ultraviolet absorbing agent, a light stabilizer, a plasticizer, a lubricant, a nucleating agent, a release agent, an antistatic agent, an inorganic pigment, an organic pigment, a dye, other polymers, etc. can be added as needed within the known limits, in addition to the above substances.

In the flame retardant polyester resin composition of the present invention, the total amount of the polybutylene terephthalate resin (A), the polyethylene terephthalate resin (B1), the copolyester resin (B2), the halogen-free flame retardant (C), and the glass fiber (D) is preferably no less than 80% by mass, more preferably no less than 90% by mass, and still more preferably no less than 95% by mass.

In a method for producing the flame retardant polyester resin composition of the present invention, the components, such as at least the components (A), (B1), (B2), (C) and (D) described above, and other substances to be compounded are compounded at the above compounding ratio in an arbitrary compounding order, and then, they are mixed with a tumbler, a Henschel mixer or the like and melt kneaded. As the melt kneading method, any of methods known to those skilled in the art is possible, and a single screw extruder, a twin-screw extruder, a kneader, a Banbury mixer, a roll, and so on can be used, and among these, a twin-screw extruder is preferably used.

The glass fiber (D) and the like that are easy to break in the extrusion process are preferably fed through a side opening of a twin-screw extruder to prevent breakage of the glass fiber, but it is not particularly limited. The silane coupling agent may be added simultaneously with addition of the raw material components other than (D), but it is preferably added after it is imparted to the component (D) in advance.

In order to remove volatile components and decomposed low-molecular weight components during processing, and moreover, in order to enhance reactivity of the polyester resin with a modified resin or a reinforcement, it is desirable to carry out suction with a vacuum pump between the side opening that is a glass fiber feed part and a die head at the tip of the extruder.

Melt mass flow rate (MFR) of the flame retardant polyester resin composition of the present invention at a moisture content of no more than 0.05% (0.05% by mass) is no less than 10 g/10 min (measured at 265° C. under a load of 2160 g in accordance with JIS K 7210-1:2014). If the MFR is less than 10 g/10 min, the resin composition does not reach corners of the mold unless the cylinder temperature is raised to a high temperature or the injection pressure is increased during injection molding. On the other hand, if the cylinder temperature is raised to a high temperature or the injection pressure is increased, residence performance of the resin composition is deteriorated, or a problem of molding appearance, such as silver streak, tends to occur. The MFR is preferably no less than 12 g/10 min, and more preferably no less than 15 g/10 min. The upper limit of the MFR is preferably no more than 100 g/10 min, more preferably no more than 80 g/10 min, and still more preferably no more than 70 g/10 min.

The flame retardant polyester resin composition of the present invention has flame retardance of UL94 standard V-0 (1/16 inch thick), and preferably that of UL94 standard V-0 (1/32 inch thick).

The flame retardant polyester resin composition of the present invention has a flexural strength, as measured in accordance with ISO-178, of no less than 140 MPa, and satisfies the following expression (1):

$$0.5 \leq \beta/\alpha \quad (1)$$

wherein $\alpha$ is a flexural strength of a molded article obtained by molding the flame retardant polyester resin composition at a cylinder temperature of 265° C. for a residence time of 5 minutes, and $\beta$ is a flexural strength of a molded article obtained by molding the flame retardant polyester resin composition at a cylinder temperature of 265° C. for a residence time of 10 minutes.

Here, the flexural strength as measured in accordance with ISO-178 refers to a flexural strength ($\alpha$) of a molded article obtained by molding for a residence time of 5 minutes. The upper limit of the flexural strength ($\alpha$) is not particularly limited, but in the case of the flame retardant polyester resin composition of the present invention, it is approximately 220 MPa.

If the $\beta/\alpha$ is less than 0.5, residence stability of the polyester resin composition in a cylinder of an injection molding machine is poor, and a decrease in mechanical properties markedly occurs between the beginning of molding and the end of molding. The $\beta/\alpha$ is preferably no less than 0.6. The upper limit of the $\beta/\alpha$ is 1.0.

EXAMPLES

Hereinafter, the present invention will be described in more detail with reference to examples, but the present invention is in no way limited by these examples.

The characteristic and physical property values shown in the following examples and comparative examples were measured by the following test methods.

(1) Reduced viscosity of polyester resin (dL/g):

In 25 mL of a mixed solvent of phenol/tetrachloroethane (mass ratio 6/4), 0.1 g of a sample was dissolved, and the reduced viscosity was measured at 30° C. using an Ubbelohde viscometer.

(2) Flexural strength: measured in accordance with ISO-178.

(3) Flexural modulus: measured in accordance with ISO-178.

(4) Deflection temperature under load (HDT): A multipurpose test specimen of ISO-3167 was produced by an injection molding machine (manufactured by Toshiba Machine Co., Ltd., IS80), and HDT was measured under a load of 1.82 MPa in accordance with ISO-75.

(5) Melt mass flow rate (MFR):

Melt mass flow rate is an amount (g) of a resin that has flowed at a temperature of 265° C. under a load of 2160 g for 10 minutes in accordance with JIS K-7210-1:2014. Each sample that was in a dry state where the moisture content was no more than 0.05% was set in an apparatus to prevent variation of MFR due to moisture, and MFR was measured.

(6) Molded article appearance:

Using an embossing plate mold of 100 mm×100 mm×2 mm thickness, injection molding was carried out with an injection molding machine at a resin temperature of 265 to 280° C. and a mold temperature of 80° C., 100° C. or 120° C., thereby obtaining molded articles of different mold temperatures. Among the resulting molded articles, a molded article having most excellent appearance was subjected to the following visual evaluation.

A: There is no floating of glass fibers on the entire surface of the flat plate, and surface gloss is excellent.

B: Floating of glass fibers is observed on the end surface away from the gate.

C: Floating of glass fibers is observed on the entire surface of the molded article, and surface gross is poor.

(7) Warpage deformation:

Using a mold of 100 mm×100 mm×2 mm thickness having film gates and ribs on one side, molding was carried out under the same molding conditions (mold temperature: 80° C., 100° C., 120° C.) as those for the molded articles of the item (6) to produce molded articles each having 5 ribs in the direction perpendicular to the flow direction of the resin, each of the ribs having a length of 100 mm, a height of 1 mm and a thickness of 1 mm, and a warpage deformation amount of each molded article was measured (the value of A in FIG.

1 was determined from a mean value of three molded articles of different mold temperatures).
C: warpage deformation amount >3 mm
B: 3 mm warpage deformation amount ≥2 mm
A: warpage deformation amount <2 mm
(8) Residence stability (β/α):
Using an injection molding machine (manufactured by Toshiba Machine Co., Ltd., IS80), continuous injection molding was carried out at a cylinder temperature of 260° C. and a mold temperature of 80° C. for a cycle time of 60 seconds to produce ISO dumbbell specimens, then flexural strengths of ISO dumbbell specimens in the fifth shot and the tenth shot were measured, and β/α was calculated. The dumbbell specimen in the fifth shot is for measuring a flexural strength (α) of a molded article obtained by molding for a residence time of 5 minutes, and the dumbbell specimen in the tenth shot is for measuring a flexural strength (β) of a molded article obtained by molding for a residence time of 10 minutes. The flexural strength of the item (2) refers to α.
(9) Flammability test:
Flammability of test specimens with thicknesses of 1/16 inch and 1/32 inch was evaluated in accordance with UL94.
Raw materials used in the examples and the comparative examples are as follows.
Polybutylene terephthalate resin (A): manufactured by TOYOBO CO., LTD., reduced viscosity 0.83 dl/g
Polyethylene terephthalate resin (B1): manufactured by TOYOBO CO., LTD., RE-530 (reduced viscosity 0.63 dl/g)
Copolyester resin (B2-1): copolymer having compositional ratio of TPA//EG/NPG=100//70/30 mol %, reduced viscosity 0.83 dl/g
Copolyester resin (B2-2): copolymer having compositional ratio of TPA/IPA//EG/NPG=50/50//50/50 mol %, reduced viscosity 0.56 dl/g
Copolyester resin (B2-3): copolymer having compositional ratio of TPA//EG/1,2PG=100//30/70 mol %, reduced viscosity 0.56 dl/g
Halogen-free flame retardant (C-1): aluminum phosphinate (manufactured by Clariant Japan K.K., EXOLIT OP1240)
Halogen-free flame retardant (C-2): aluminum phosphinate/hexaphenoxytriphosphazene/melamine polyphosphate=42/37/21 (mass ratio)
Glass fiber (D): manufactured by Nippon Electric Glass Co., Ltd., T-120H
As other additives, the following substances were used.
Antioxidant: Irganox 1010 (manufactured by Ciba Specialty Chemicals Inc.)
Release agent: WE40 (manufactured by Clariant Japan K.K.)
Black pigment: ABF-T9534 (manufactured by RESINO COLOR INDUSTRY CO., LTD.)

Polymerization Example for Copolyester Resin (B2-1): TPA//EG/NPG Copolymer

To a 10 L-volume esterification reaction tank having a stirrer and a distillation condenser, 2414 parts by mass of terephthalic acid (TPA), 1497 parts by mass of ethylene glycol (EG), and 515 parts by mass of neopentyl glycol (NPG) were fed, and as catalysts, an 8 g/L aqueous solution of germanium dioxide was added in such a manner that a germanium atom was contained in an amount of 30 ppm based on the resulting polyester, and a 50 g/L ethylene glycol solution of cobalt acetate tetrahydrate was added in such a manner that a cobalt atom was contained in an amount of 35 ppm based on the resulting polymer.

Thereafter, the reaction system was gradually heated until the temperature finally became 240° C., and esterification reaction was carried out at a pressure of 0.25 MPa for 180 minutes After it was confirmed that distilled water did not come out of the reaction system, the reaction system was returned to normal pressure, and a 130 g/L ethylene glycol solution of trimethyl phosphate was added in such a manner that a phosphorus atom was contained in an amount of 52 ppm based on the resulting polymer.

The oligomer obtained was transferred into a polycondensation reaction tank, and the tank was depressurized while gradually heating so that the temperature finally became 280° C. and the pressure finally became 0.2 hPa. The reaction was carried out until the torque value of the stirrer corresponding to the intrinsic viscosity became a desired numerical value, and thus, polycondensation reaction was completed. The reaction time was 100 minutes. The molten polyester resin obtained was drawn out into strands from a draw-out port at the lower part of the polymerization tank, cooled in a water tank, and then cut into chips.

As a result of NMR analysis of the copolyester obtained as above, the copolyester had a composition of 100% by mol of terephthalic acid as a dicarboxylic acid component, and 70% by mol of ethylene glycol and 30% by mol of neopentyl glycol as diol components.

Other copolyester resins (B2) described in the examples were produced in the same manner as that for the TPA//EG/NPG copolymer (B2-1), except for the raw materials and the compositional ratio to be used.

Examples 1 to 6, Comparative Examples 1 to 5

In a method for producing flame retardant polyester resin compositions of the examples and the comparative examples, the above raw materials were weighed in accordance with compounding ratios (% by mass) shown in Table 1, and they were melt kneaded with a 350 twin-screw extruder (manufactured by Toshiba Machine Co., Ltd.) at a cylinder temperature of 270° C. and a screw rotation speed of 100 rpm. Raw materials other than the glass fiber were fed to the twin-screw extruder through the hopper, and the glass fiber was fed by side feeding through a vent port.

Pellets of the flame retardant polyester resin compositions obtained were molded into evaluation samples with an injection molding machine.

The evaluation results are set forth in Table 1.

TABLE 1

|  |  |  | Example 1 | Example 2 | Example 3 | Example 4 | Example 5 | Example 6 |
|---|---|---|---|---|---|---|---|---|
| Composition | Polybutylene terephthalate resin (A) | % by mass | 34.6 | 34.6 | 34.6 | 34.6 | 39 | 18.6 |
|  | Polyethylene terephthalate resin (B1) | % by mass | 10 | 5 | 5 | 5 | 8 | 26 |

TABLE 1-continued

|  |  |  | | | | | | |
|---|---|---|---|---|---|---|---|---|
|  | Copolyester resin (B2-1) | % by mass | 6 | 11 | — | — | 11 | 6 |
|  | Copolyester resin (B2-2) | % by mass | — | — | 11 | — | — | — |
|  | Copolyester resin (B2-3) | % by mass | — | — | — | 11 | — | — |
|  | Halogen-free flame retardant (C-1) | % by mass | 18 | 18 | 18 | 18 | 20.6 | 18 |
|  | Halogen-free flame retardant (C-2) | % by mass | — | — | — | — | — | — |
|  | Glass fiber (D) | % by mass | 30 | 30 | 30 | 30 | 20 | 30 |
|  | Antioxidant | % by mass | 0.2 | 0.2 | 0.2 | 0.2 | 0.2 | 0.2 |
|  | Release agent | % by mass | 0.4 | 0.4 | 0.4 | 0.4 | 0.4 | 0.4 |
|  | Black pigment | % by mass | 0.8 | 0.8 | 0.8 | 0.8 | 0.8 | 08 |
| Various characteristics | Flexural strength | MPa | 173 | 171 | 174 | 169 | 141 | 188 |
|  | Flexural modulus | GPa | 10.3 | 9.8 | 10.4 | 9.9 | 8.1 | 11.0 |
|  | HDT (1.82 MPa) | °C. | 205 | 193 | 195 | 190 | 200 | 210 |
|  | MFR(265° C.) | g/10 min | 22 | 20 | 20 | 23 | 63 | 13 |
|  | Molded article appearance | — | A | A | A | A | A | B |
|  | Molded article warpage deformation | — | A | A | A | A | A | B |
|  | UL flammability test | 1/16 inch | — | V-0 | V-0 | V-0 | V-0 | V-0 | V-0 |
|  |  | 1/32 inch | — | V-2 | V-2 | V-2 | V-2 | V-2 | V-2 |
|  | β/α | — | 0.8 | 0.8 | 0.8 | 0.8 | 0.7 | 0.8 |

|  |  |  | Comparative Example 1 | Comparative Example 2 | Comparative Example 3 | Comparative Example 4 | Comparative Example 5 |
|---|---|---|---|---|---|---|---|
| Composition | Polybutylene terephthalate resin (A) | % by mass | 37.6 | 34.6 | 2.6 | 26.2 | 346 |
|  | Polyethylene terephthalate resin (B1) | % by mass | 13 | — | 42 | 7 | 10 |
|  | Copolyester resin (B2-1) | % by mass | — | 16 | 6 | 5 | 6 |
|  | Copolyester resin (B2-2) | % by mass | — | — | — | — | — |
|  | Copolyester resin (B2-3) | % by mass | — | — | — | — | — |
|  | Halogen-free flame retardant (C-1) | % by mass | 18 | 18 | 18 | 15.4 | — |
|  | Halogen-free flame retardant (C-2) | % by mass | — | — | — | — | 18 |
|  | Glass fiber (D) | % by mass | 30 | 30 | 30 | 45 | 30 |
|  | Antioxidant | % by mass | 0.2 | 0.2 | 0.2 | 02 | 0.2 |
|  | Release agent | % by mass | 0.4 | 0.4 | 0.4 | 0.4 | 0.4 |
|  | Black pigment | % by mass | 0.8 | 0.8 | 0.8 | 0.8 | 0.8 |
| Various characteristics | Flexural strength | MPa | 176 | 170 | 198 | 193 | 168 |
|  | Flexural modulus | GPa | 10.7 | 99 | 12.3 | 11.1 | 9.4 |
|  | HDT (1.82 MPa) | °C. | 210 | 170 | 224 | 212 | 202 |
|  | MFR(265° C.) | g/10 min | 23 | 24 | 5 | 3 | 20 |
|  | Molded article appearance | — | A | A | C | C | A |
|  | Molded article warpage deformation | — | C | A | B | B | A |
|  | UL flammability test | 1/16 inch | — | V-0 | V-0 | V-0 | V-0 | V-0 |
|  |  | 1/32 inch | — | V-2 | V-2 | V-2 | V-2 | V-0 |
|  | β/α | — | 0.8 | 0.8 | 0.8 | 0.8 | 0.4 |

From Table 1, it can be seen that in the flame retardant polyester resin compositions described in Examples 1 to 6, good results were obtained regarding all the items, and all of strength/rigidity, heat distortion properties, moldability, appearance, low warpage properties, flame retardance, and residence stability were well-balanced. On the other hand, Comparative Example 1 did not contain the copolyester resin (132), and this resulted in poor warpage deformation, and Comparative Example 2 did not contain the polyethylene terephthalate resin (B1), and this resulted in poor heat distortion properties (deflection temperature under load). In Comparative Examples 3 and 4 in which MFR was lower than the predetermined value, fluidity was low, and an aimed molded article could not be obtained from the viewpoints of appearance and warpage deformation, and in Comparative Example 5, residence stability was deteriorated due to the flame retardant.

INDUSTRIAL APPLICABILITY

The flame retardant polyester resin composition of the present invention has little warpage deformation and good molded article appearance though it has high strength and high rigidity, and moreover, it is excellent in residence stability, so that it can be used in a wide range of applications, such as electric/electronic parts, machine mechanism parts, and automobile parts.

REFERENCE SIGNS LIST

L: flow direction of resin composition
W: direction perpendicular to flow of resin composition
1: molded article
2: film gate
3: rib
A: warpage deformation amount

The invention claimed is:

1. A flame retardant polyester resin composition comprising 3 to 74% by mass of a polybutylene terephthalate resin (A), 3 to 60% by mass of a polyethylene terephthalate resin (B1), 3 to 50% by mass of a copolyester resin (B2), 10 to 50% by mass of a halogen-free flame retardant (C), and 10 to 40% by mass of a glass fiber (D), wherein
   the copolyester resin (B2) is a polyester resin obtained by copolymerizing an ethylene terephthalate unit with at least one selected from the group consisting of neopentyl glycol, 1,2-propanediol, diethylene glycol, 1,4-cyclohexanedimethanol, and isophthalic acid;
   a melt mass flow rate (MFR) of the flame retardant polyester resin composition at a moisture content of no more than 0.05% is no less than 10 g/10 min (measured at 265° C. under a load of 2160 g in accordance with JIS K 7210-1:2014);
   the flame retardant polyester resin composition exhibits flame retardance of UL94 standard V-0 (1/16 inch thick); and
   the flame retardant polyester resin composition has a flexural strength, as measured in accordance with ISO-178, of no less than 140 MPa, and satisfies the following expression (1):

$$0.5 \leq \beta/\alpha \quad (1)$$

wherein $\alpha$ is a flexural strength of a molded article obtained by molding the flame retardant polyester resin composition at a cylinder temperature of 265° C. for a residence time of 5 minutes, and $\beta$ is a flexural strength of a molded article obtained by molding the flame retardant polyester resin composition at a cylinder temperature of 265° C. for a residence time of 10 minutes.

2. The flame retardant polyester resin composition according to claim 1, wherein the halogen-free flame retardant (C) comprises a phosphinic acid metal salt.

3. A molded article being any one of an electric/electronic part, OA equipment, a household electric appliance part, an automobile part, and a machine mechanism part, the molded article comprising the flame retardant polyester resin composition according to claim 2.

4. A molded article being any one of an electric/electronic part, OA equipment, a household electric appliance part, an automobile part, and a machine mechanism part, the molded article comprising the flame retardant polyester resin composition according to claim 1.

* * * * *